(12) United States Patent
Fleischer-Pedersen

(10) Patent No.: US 10,286,428 B2
(45) Date of Patent: May 14, 2019

(54) TOOLS AND METHODS FOR CLEANING SURVEY CABLES

(75) Inventor: Knut-Birger Fleischer-Pedersen, Bjornevaten (NO)

(73) Assignee: PGS Geophysical AS, Oslo (NO)

( * ) Notice: Subject to any disclaimer, the term of this patent is extended or adjusted under 35 U.S.C. 154(b) by 1784 days.

(21) Appl. No.: 13/276,889

(22) Filed: Oct. 19, 2011

(65) Prior Publication Data

US 2013/0098394 A1 Apr. 25, 2013

(51) Int. Cl.
| | |
|---|---|
| *B08B 1/00* | (2006.01) |
| *B08B 9/023* | (2006.01) |
| *B63B 35/00* | (2006.01) |
| *G01V 13/00* | (2006.01) |
| *B08B 1/02* | (2006.01) |
| *B08B 9/00* | (2006.01) |
| *B08B 9/027* | (2006.01) |
| *B08B 7/00* | (2006.01) |

(52) U.S. Cl.
CPC .............. *B08B 9/023* (2013.01); *B08B 1/008* (2013.01); *B63B 35/00* (2013.01); *G01V 13/00* (2013.01)

(58) Field of Classification Search
None
See application file for complete search history.

(56) References Cited

U.S. PATENT DOCUMENTS

| | | | |
|---|---|---|---|
| 2,782,436 A | 2/1957 | Tomer | |
| 2,942,286 A * | 6/1960 | Losey | E21B 33/08 |
| | | | 15/220.4 |
| 3,066,254 A | 11/1962 | Price et al. | |
| 4,926,178 A | 5/1990 | Mallinson | |
| 6,452,531 B1 | 9/2002 | Miller et al. | |
| 7,145,833 B1 | 12/2006 | Hoogeveen | |
| 7,409,919 B2 | 8/2008 | Hoogeveen et al. | |
| 7,660,203 B2 | 2/2010 | Barakat et al. | |
| 8,228,759 B2 | 7/2012 | Ray | |
| 8,325,922 B1 | 12/2012 | Sun et al. | |
| 8,339,896 B2 | 12/2012 | Van Borselen et al. | |
| 8,358,560 B2 | 1/2013 | Muyzert et al. | |
| 2004/0188013 A1 | 9/2004 | Temple | |

(Continued)

FOREIGN PATENT DOCUMENTS

| | | |
|---|---|---|
| FR | 2847987 | 6/2004 |
| GB | 232665 | 4/1925 |

(Continued)

OTHER PUBLICATIONS

United Kingdom Search Report, dated Feb. 20, 2013.

(Continued)

*Primary Examiner* — Eric W Golightly
*Assistant Examiner* — Arlyn I Rivera-Cordero

(57) ABSTRACT

At least some disclosed survey cleaning tool embodiments include a cable guide configured to lift a survey cable from the water and to guide it into a scraper mechanism that is configured to clean debris from the survey cable. At least some disclosed method embodiments include moving a cleaning tool along a survey cable deployed in a body of water; lifting the survey cable to a surface of the body of water; and rotating two or more scraper wheels against the survey cable. Some disclosed method embodiments may augment or replace the scraper wheels with two or more scraper blades.

9 Claims, 8 Drawing Sheets

(56) References Cited

U.S. PATENT DOCUMENTS

| | | |
|---|---|---|
| 2006/0054186 A1 | 3/2006 | Lepage et al. |
| 2006/0186887 A1 | 8/2006 | Strack et al. |
| 2006/0239117 A1 | 10/2006 | Singh et al. |
| 2009/0147619 A1 | 6/2009 | Welker |
| 2010/0116054 A1 | 5/2010 | Paulson |

FOREIGN PATENT DOCUMENTS

| | | |
|---|---|---|
| GB | 2411197 | 8/2005 |
| GB | 2430142 | 3/2007 |
| GB | 2444604 | 6/2008 |
| JP | 2011189255 | 9/2011 |

OTHER PUBLICATIONS

U.S. Non-Final Office Action, dated May 16, 2013, U.S. Appl. No. 13/206,002, "Digital Sensor Streamers and Applications Thereof", filed Aug. 9, 2011, 7 pgs.

U.S. Non-Final Office Action, dated Sep. 11, 2013, U.S. Appl. No. 13/073,832, "Wireless Communication in a Geophysical Survey Streamer", filed Mar. 28, 2011, 20 pgs.

Preliminary Search Report in France Application No. 1259944 dated Sep. 27, 2016, 7 pages.

Examination Report in GB Application No. 1501660.3 dated Sep. 24, 2015, 3 pages.

Search Report in GB Application No. 1501660.3 dated Mar. 5, 2015, 7 pages.

Examination and Search Report in GB Application No. 1501659.5 dated Mar. 2, 2015, 3 pages.

*Windsurfing International Inc.* v *Tabur Marine (Great Britain) Ltd*, [1985] RPC 59) restated in Pozzoli (*Pozzoli SPA* v *BDMO SA* [2007] EWCA Civ 588) In The Court of Appeal, Jan. 31, 1984, 18 pages.

*Pozzoli SPA* v *BDMO SA*, [2007] EWCA Civ 588, Court of Appeal, Jun. 22, 2007, 20 pages.

\* cited by examiner

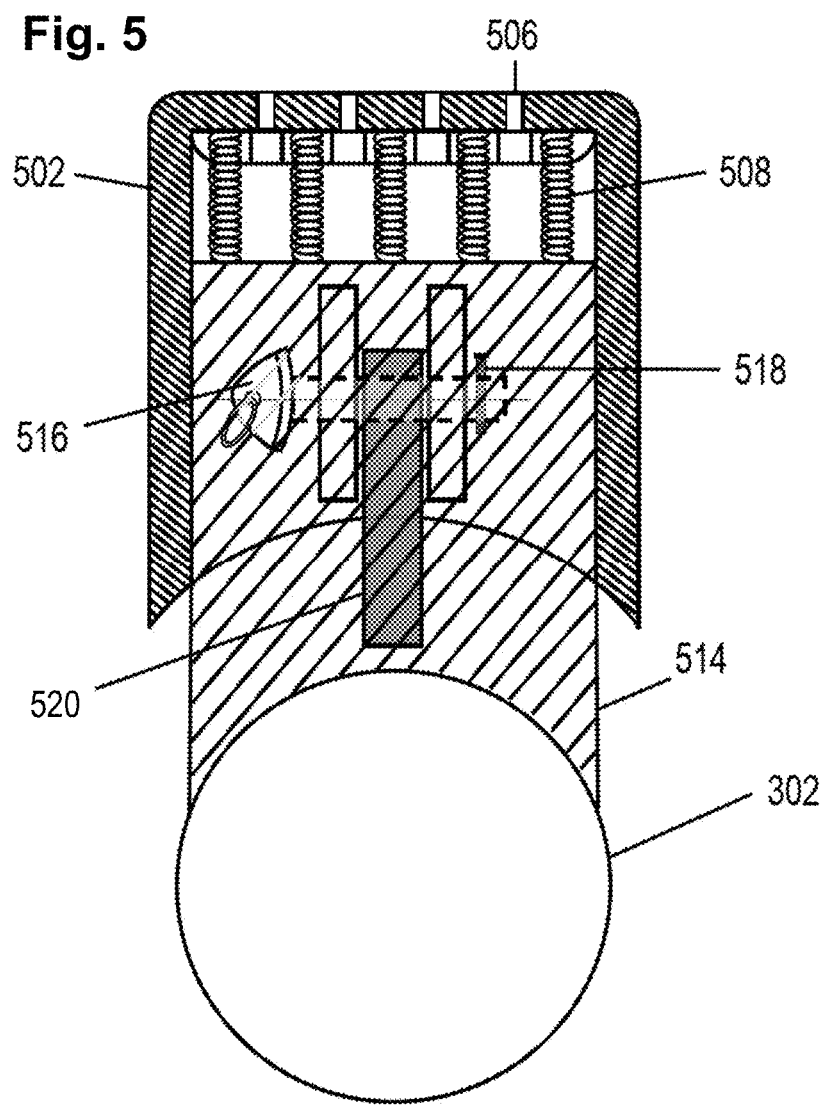

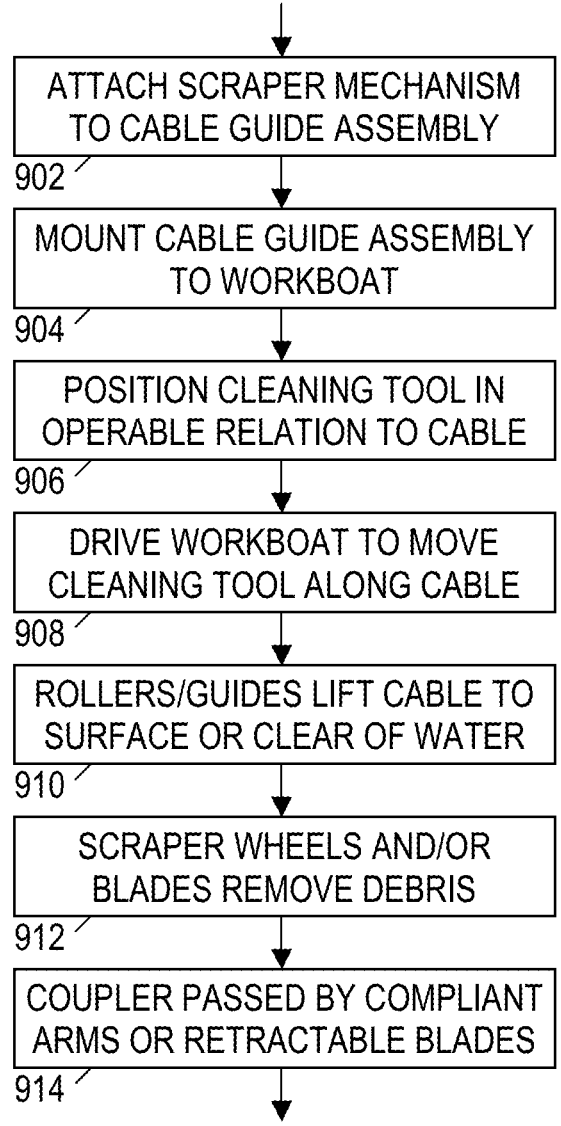

TOOLS AND METHODS FOR CLEANING SURVEY CABLES

BACKGROUND

Marine surveys usually employ geophysical sensors below the water's surface, e.g., in the form of long streamer cables towed behind a ship, or ocean-bottom cables resting on the ocean floor. Conventional marine survey streamer cables can often be 12 kilometers (km) long, and may include hundreds, or even thousands of geophysical sensors. Several such streamers are often positioned or towed in parallel over a survey region. Seismic and electromagnetic sources are also often attached to cables for towing or positioning on the ocean floor. The term "survey cable" will be used generically herein to cover all types of submerged cabling employed in conducting marine surveys including, but not limited to, tow cables for geophysical sources, streamer cables, and harness cables for the source/sensor array.

Marine surveys often last for weeks or months, which is more than enough time for the survey cables to attract barnacles and other unwanted wildlife or debris. Such materials tend to increase drag on the cables, thereby requiring a greater amount of towing energy and placing increased strain on the ship, the cables, and the positioning devices. Such material can also induce additional turbulence, which may impair the quality of the data acquired from the sensors distributed along the cable. Current methods of cleaning survey streamer cables tend to be time consuming and labor intensive.

BRIEF DESCRIPTION OF THE DRAWINGS

A better understanding of the various disclosed system and method embodiments can be obtained when the following detailed description is considered in conjunction with the drawings, in which:

FIG. 5 is a front sectional view of a scraper blade mechanism embodiment;

FIG. 9 is a flow diagram of an illustrative cable cleaning method.

DETAILED DESCRIPTION

The issues identified in the background are at least in part addressed by improved tools and methods for cleaning survey cables from a workboat traveling along the length of the cables. At least some embodiments of the tools can be easily fitted to the workboat and positioned in operable relation around the survey cable. Moreover, at least some tool embodiments are designed to require less manpower for their operation and maintenance, and to at least partly automate the cleaning process with a hydraulic motor or a friction belt that controls the rotation rate of one or more scraper wheels in relation to the speed at which the workboat travels along the cable. A system of springs and, in some embodiments, a trigger lever, can be employed to enable automatic handling of connectors, steering devices, or other elements having an enlarged profile relative to the main cable. With the current industry trend towards longer and thinner streamers due to geographical and operational benefits, such cleaning tools can facilitate quicker and more efficient cleaning of the survey cables.

Figure 1:
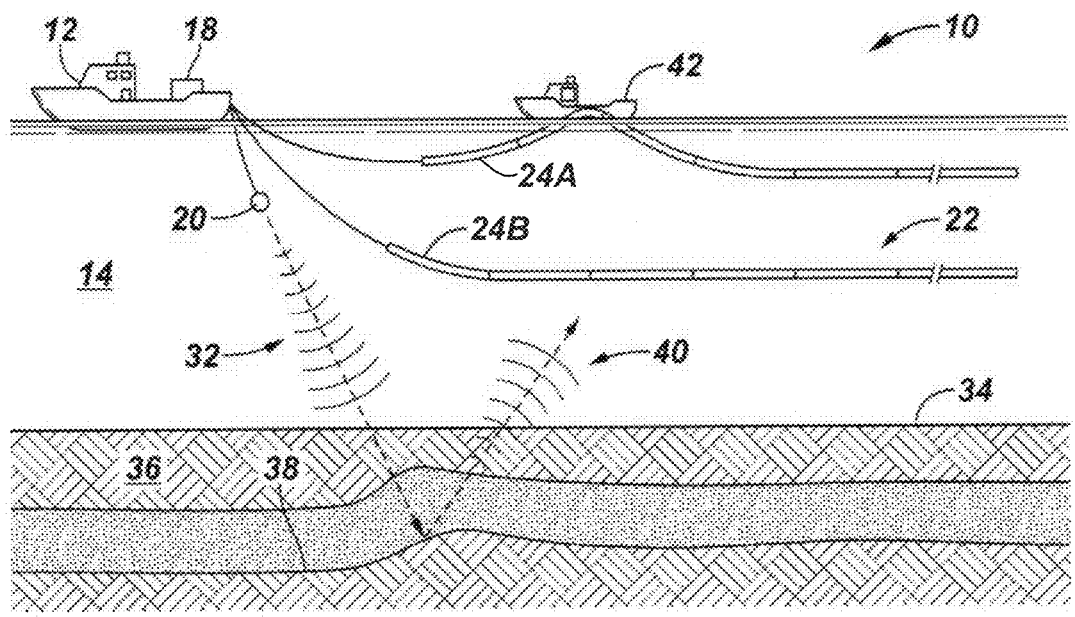
FIG. 1 is a side elevation view of an illustrative marine survey system during a cleaning operation.

The disclosed systems and methods are best understood in the context of a suitable usage environment. Accordingly, FIG. 1 shows an illustrative marine geophysical survey system 10 during a cleaning operation. A survey vessel or ship 12 moves along the surface of a body of water 14, such as a lake or an ocean. The survey system 10 includes a data recording system 18 aboard the ship 12. The illustrative survey system also includes a geophysical source 20 and a sensor array 22 towed through the water 14 by the ship 12.

Figure 2:
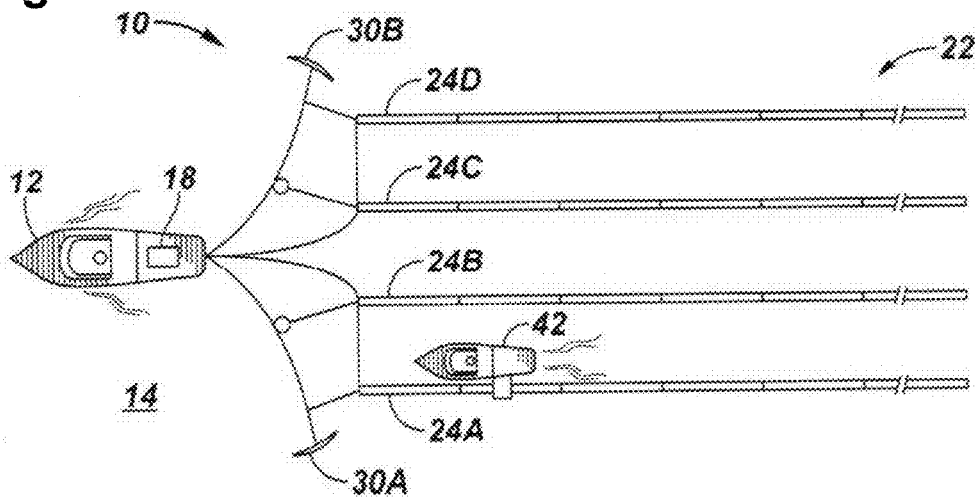
FIG. 2 is a top plan view of the marine survey system of FIG. 1.

FIG. 2 shows the illustrative marine geophysical survey system 10 from above. Referring to FIGS. 1 and 2, sensor array 22 includes multiple spaced apart sensor units embedded in one or more marine survey streamer cables 24A-24D to detect geophysical signals and produce corresponding output signals for collection and storage by data recording system 18. The marine survey streamer cables 24A-24D may be towed via a harness that produces a desired arrangement. Such a harness may include multiple interconnected cables and a pair of controllable paravanes 30A and 30B connected to opposite sides of the harness. As the ship 12 tows the harness through the water 14, the paravanes 30A and 30B pull the sides of the harness in opposite directions transverse to a direction of travel of the ship 12. Electrical conductors and/or fiber optic cables connect the sensor units in the streamer sections of the marine survey streamer cables 24A-24D to the data recording system 18 aboard the ship 12. Other harness and cable configurations may also be used.

The marine survey streamer cables can be designed with a modular construction so that each marine survey streamer cable is formed by joining multiple streamer sections end to end. Such modular construction, e.g., with substantially identical and interchangeable sections, greatly simplifies handling, maintenance, and repair. If a problem develops with one of the streamer sections, the problematic streamer section can be readily replaced by any other spare streamer section. The connectors between streamer sections include terminals (e.g., sockets and pins) that link the communications pathways of the various streamers into a long communications backbone for the marine survey streamer cable.

During normal operation of the illustrative system, the geophysical source 20 produces acoustic waves 32 at regular intervals or at selected locations. The geophysical source 20 may be or include, for example, an air gun, a vibrator, or other device. The acoustic waves 32 travel through the water 14 and into subsurface formations 36 below a bottom surface 34. When the acoustic waves 32 encounter changes in acoustic impedance (e.g., at boundaries between strata), some of the wave energy is reflected. In FIG. 1, ray 40 represents wave energy reflected in a particular direction from interface 38. The recorded signals from the sensor units can be later interpreted to infer structure of, fluid content of, and/or composition of rock formations in the subsurface 36.

Periodically it may be desired to clean the survey cables such as, e.g., marine survey streamer cables 24A-24D. FIGS. 1 and 2 show an illustrative workboat 42 traveling the length of a marine survey streamer cable 24A in the same direction as the motion of vessel 12. As the workboat 42 travels the length of a streamer, it lifts and cleans the streamer with a cleaning tool attached to the side of the workboat.

Figure 3A:
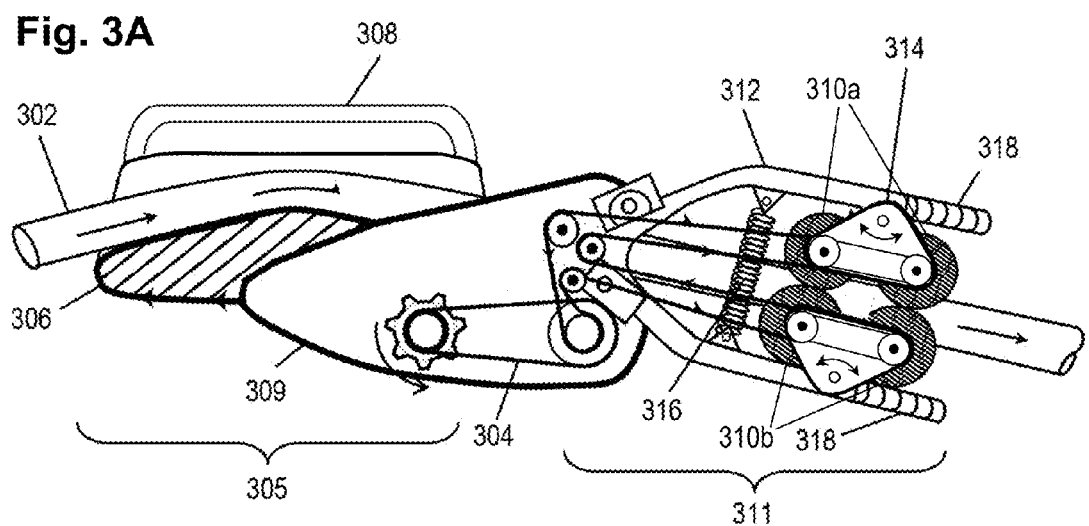
FIGS. 3A and 3B are side and top views, respectively, of a first illustrative survey cable cleaning tool embodiment.
Figure 3B:
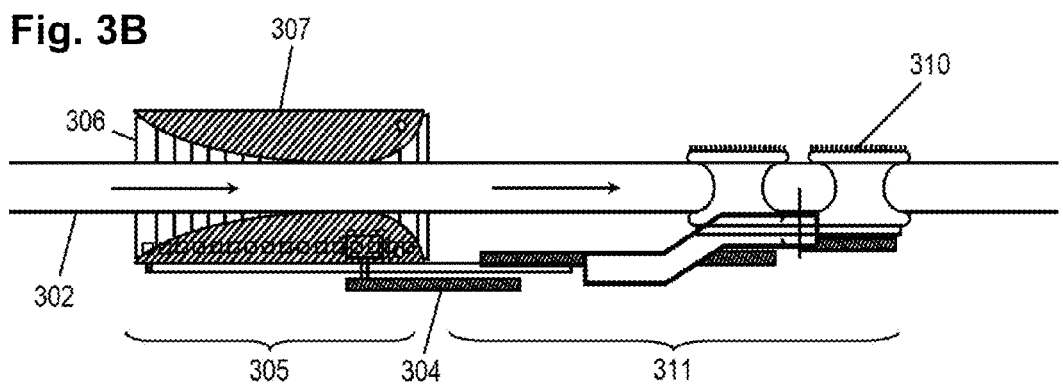

FIGS. 3A-3B are side and top views, respectively, of a first illustrative embodiment of a cleaning tool suitable for cleaning a survey cable 302. This embodiment employs a cable guide 305 with a roller mechanism 306 that lifts the survey cable clear of the water and guides it through a scraper mechanism 311. The illustrated roller mechanism 306 is a friction belt that turns in response to the motion of the survey cable through the cable guide, but other suitable roller mechanisms include wheels, pulleys, and rollers. Sidewalls 307 (FIG. 3B) help to trap the survey cable 302 on top of the roller mechanism and help guide the cable into the scraper mechanism, which may be mounted to the cable guide via a rigid side plate 309, or by other means as described further below. Bars 308 may be provided on the sidewalls 307 or elsewhere on the cable guide 305 to serve as handles for workers to use when mounting the cleaning tool to the side of the workboat.

As the cable guide 305 lifts and passes along underneath the survey cable, the cable exerts a frictional pull on the roller mechanism 306, causing it to turn at a rate that matches the speed of the cable relative to the workboat. The roller mechanism 306 is coupled via a belt drive system 304 to rotate a set of scraper wheels 310. The scraper wheels 310 have short bristles of plastic, wire, or some other material selected for its effectiveness at removing barnacles without significantly abrading the survey cable's surface. As the roller mechanism 306 turns, it turns the scraper wheels 310 so that they rotate against the motion of the survey cable 302. The ratio between the turning rate of the roller mechanism 306 and the rotation rate of the scraper wheels 310 is set by the design of the belt drive system 304 and can be adjusted by altering the relative diameters of the pulley wheels in the belt drive system.

The scraper wheels may be positioned in pairs on each side of the survey cable 302. In the embodiment of FIG. 3, a first pair 310a is on the top and a second pair 310b is on the bottom. Compliant (e.g., spring-loaded) arms 312 may hold the scraper wheel pairs in contact with the survey cable while still enabling the wheels to spread apart for, e.g., connectors, positioning devices, or other regions of the survey cable having an enlarged profile. Arm extensions may be provided as handles 318 for workers to use for separating the arms 312 when, e.g., positioning the scraper wheels around the survey cable. Springs 316, hydraulics, or other resilient mechanisms can be employed to keep the arms 312 and wheels 310 in position around the cable. The resilient mechanisms' tensions can be adjusted to enable the scraper mechanism 311 to accommodate various survey cable sizes.

Each pair of scraper wheels 310a, 310b may be flexibly mounted with a bracket 314 that pivots to enable some degree of independent travel for the two scraper wheels in each pair so that, e.g., the wheels can each follow changes in the cable profile and/or accommodate some unevenness in the wear rate for the front and back wheels. The scraper wheels rotate to strip away barnacles and other unwanted debris that has become attached to the survey cable.

In at least some embodiments, the scraper wheels 310 are configured to be easily interchangeable without the need of tools. Handles 318 enable the arms 312 to be easily opened and removed from the survey cable. While off the cable, the brackets 314 may be expected to have some free play so that, with the removal of the axle pin for the wheels 310 or, in some embodiments, the pivot pin for the brackets 314, the worn wheels can be changed out for replacement wheels. In some embodiments of the tool, the handles 318 are also removable to keep them clean while the cleaning tool is in operation. The handles 318 may slide in and out of sockets in the arms 312.

FIG. 3B illustrates a top view of the illustrative cleaning tool of FIG. 3A. As the workboat 42 moves along the length of the survey cable 302, the survey cable 302 is pulled from left to right over the roller mechanism 306. The roller mechanism 306 rotates as the cable 302 is pulled through the tool and causes the scraper wheels 310 to rotate against the direction of the cable's motion. This rotation direction provides for a more vigorous scraping of the cables, which is believed to be a more optimal cleaning method. The scraper wheels 310 strip away the barnacles and unwanted debris from the survey cable.

Figure 4A:
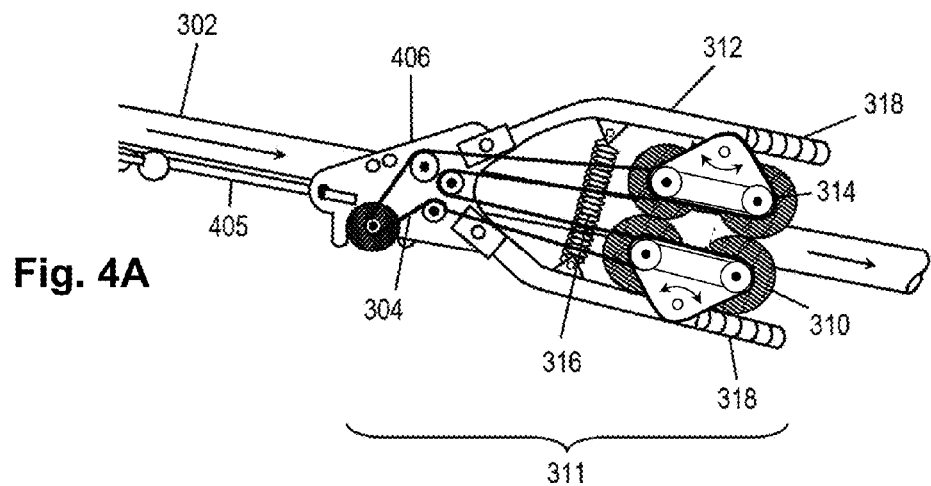
FIGS. 4A and 4B are side and top views, respectively, of a second illustrative survey cable cleaning tool embodiment.
Figure 4B:
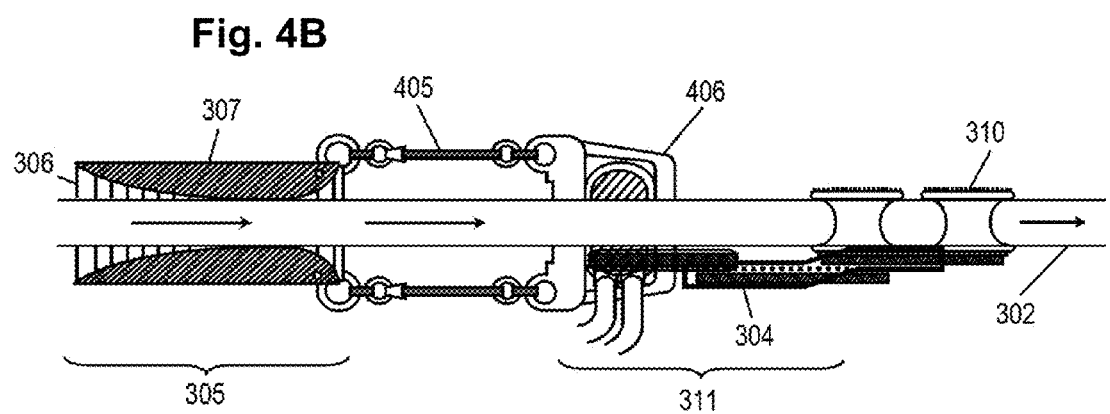

FIGS. 4A-4B illustrate a second illustrative cleaning tool embodiment for cleaning a survey cable 302. As in the previous embodiment, the cleaning tool may have a cable guide 305 (FIG. 4B) to lift and guide the survey cable 302 through the scraper mechanism 311 as the workboat moves along the length of the survey cable. The cable guide may include a roller mechanism 306 and sidewalls 307 as before, though some alternative embodiments may employ a plastic or metal slide rather than a roller mechanism to lift and guide the survey cable 302.

In the embodiment illustrated by FIGS. 4A-4B, the scraper mechanism 311 is powered by a hydraulic motor 406, though other types of motor could also be employed. The motor 406 turns the scraper wheels 310 via the belt drive system 304. As before, the scraper wheels 310 may rotate against the direction of the survey cable's motion through the tool to remove barnacles and other debris.

The scraper mechanism 311 need not be rigidly connected to the cable guide 305, and in the illustrated embodiment, it is attached with two chains or cables 405. The chains 405 provide additional flexibility for the scraper mechanism 311 to orient itself around the survey cable 302, perhaps accommodating for wave motion of the workboat if needed. Such a connection also reduces the bulk and weight of the cleaning tool, making it easier to maneuver the tool.

Figure 6:
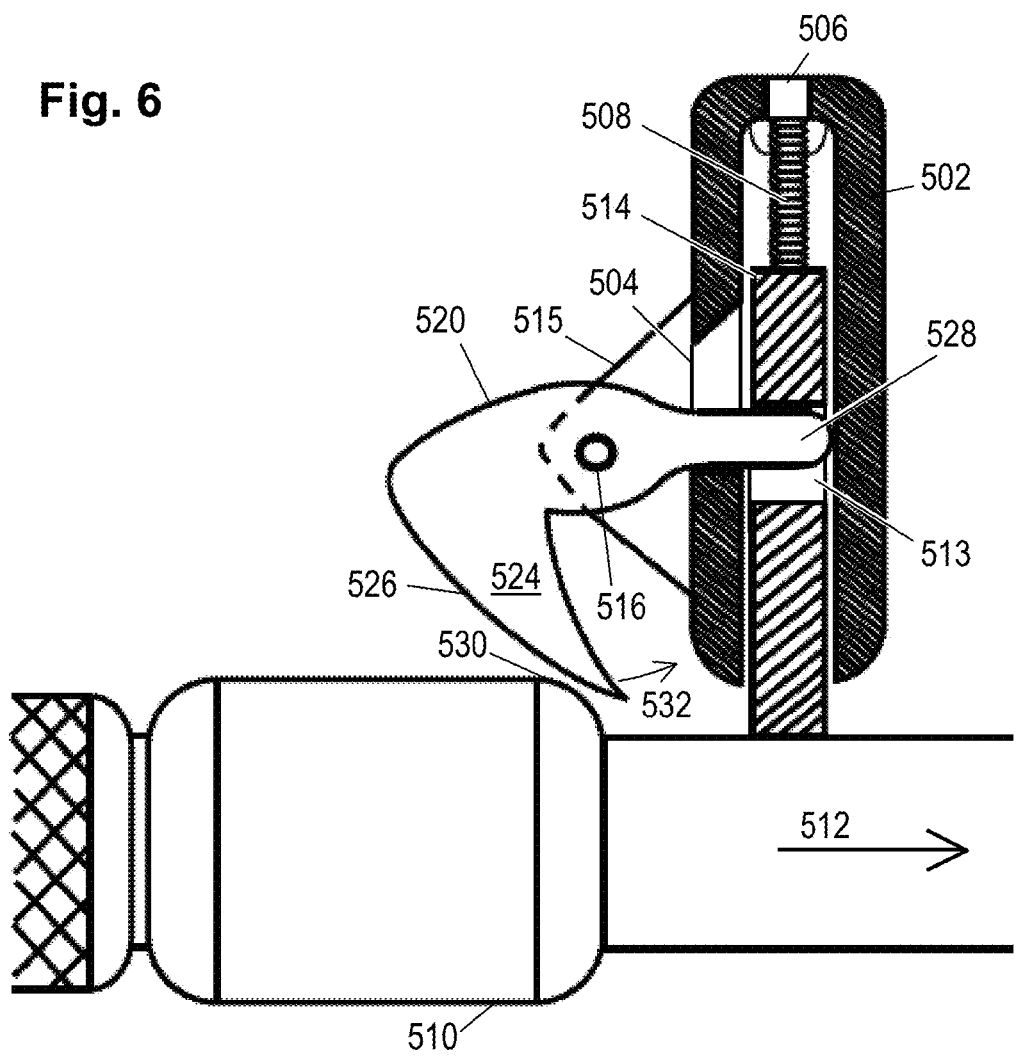
FIGS. 6-8 show stages of an illustrative scraper blade mechanism passing over a connector.

In addition to, or instead of, the scraper wheels 310 discussed above, the scraper mechanism 311 can employ one or more scraper blade devices such as that shown in FIGS. 5-8. One or more such scraper blade devices can be attached to a frame for the scraper mechanism 311, or may be directly mounted to the cable guide 305. Referring to FIGS. 5 and 6, the scraper blade device includes a blade housing 502 with a retractable scraper blade 514 and a set of one or more springs 508 that press the blade 514 against the survey cable 302 or, in the absence of a survey cable 302, press the blade to the full extent permitted by the lever 520 and the housing 502. A hole or recess 513 in the blade 514 receives a lever extension 528 that secures and, when necessary, retracts the blade 514 in the housing 502. A slot 504 in the housing 502 defines the lever's range of motion from the position shown in FIG. 6 to that shown in FIG. 7. One or more ventilation holes 506 may be provided to enable air and/or other fluids to easily escape the housing 502 as blade 514 moves.

The lever 520 is secured to two fulcrum posts 515 on the housing 502 by a quick connect fastener (in this case a bolt 516 retained by a cotter pin 518). The fulcrum posts 515 sandwich the lever 520 to provide support while allowing the lever to pivot about the bolt 516. Lever extension 528 is positioned within slot 504, which has upper and lower edges that limit the extent to which the lever 520 can pivot on bolt 516. Note that blade replacement can be readily accomplished by removing the quick connect fastener and pulling the lever 520 from between the fulcrum posts 515, thereby removing lever extension 528 from the recess 513 in the blade 514. This removal frees the blade 514 to slide out of the housing 502 so that it can then be replaced. The replacement blade 514 is pressed into the housing 502 against the biasing springs 508 until the recess 513 aligns with slot 504 and the lever extension 528 can be re-inserted into the recess. The lever 520 is then re-secured by the quick connect fastener.

The housing 502 is positioned so that the scraper blade 514 is configured to press against the surface of survey cable 302 as the cable passes through the tool. Other scraper blade devices may also be positioned at different orientations around the cable to ensure that the entire circumference of the cable can be cleaned by the tool. The tip of blade 514 may have a contoured shape, such as a circular arc sized to fit the cable profile, to reduce the number of scraper blade devices needed to clean the cable effectively.

Figure 7:
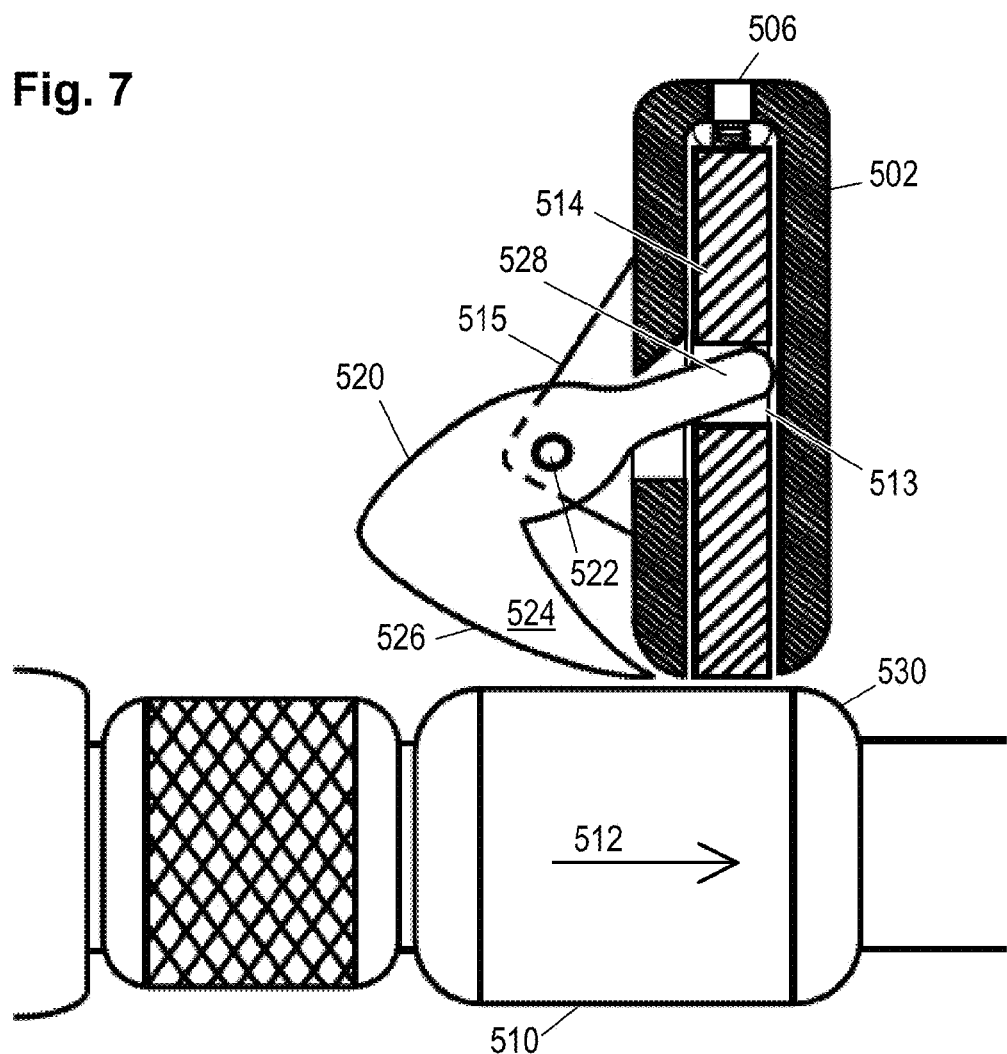
Figure 8:
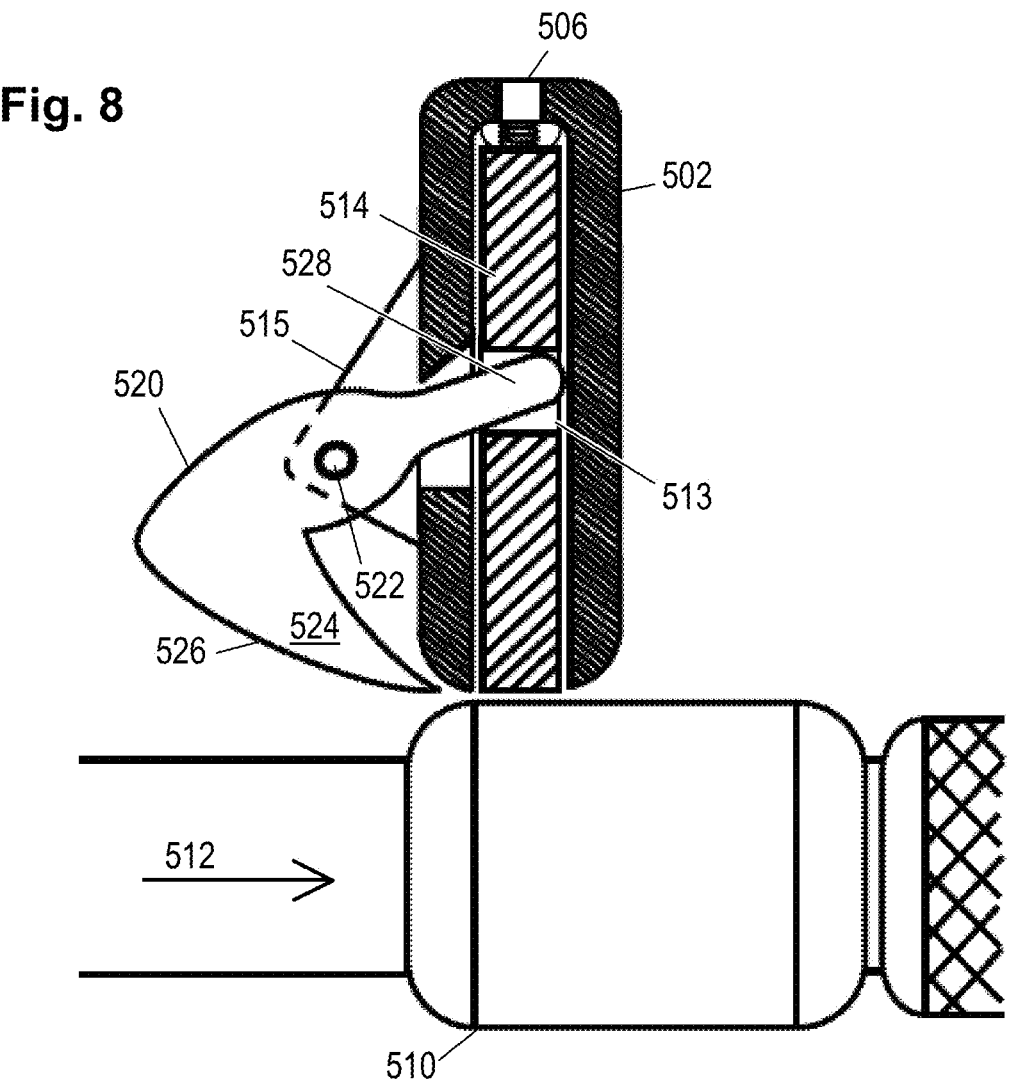

FIGS. 6-8 show an illustrative progression of how the scraper blade device may traverse a connector or other portion of the survey cable having an enlarged diameter. In FIG. 6, the springs 508 have fully extended the scraper blade 514 to contact the surface of the survey cable, and lever 520 is in a rest position. The lever projection 524 is positioned to encounter any enlarged profiles with a sloped leading edge 526. As the cable moves through the cleaning device in direction 512, one or more connectors 510 are expected to traverse the device, with a leading edge 530 that contacts lever projection 524 and causes the lever 520 to pivot about bolt 516 as indicated by arrow 532. As the lever 520 pivots, the lever extension 528 moves upward in slot 504 to retract the blade 514 clear of the connector 510.

FIG. 7 shows the scraper blade mechanism as the connector 510 passes underneath the retracted blade 514. The leading edge 530 has moved the lever projection 524 in the direction of the survey cable's motion 512, thereby causing the projection 524 to pivot away from the survey cable. The enlarged profile of connector 510 maintains the projection 524 in this position to keep the blade 514 retracted as the connector passes.

FIG. 8 shows the scraper blade mechanism as a connector 510 traveling in direction 512 moves clear of the projection 524. In this position, the springs 508 press the blade 514 initially against the enlarged profile of connector 510 and, as the connector 510 moves clear, against the normal profile of the survey cable. As the blade 514 returns to its extended position (FIG. 6), the lever 520 returns to its rest position with the lever projection 524 positioned to detect any subsequent connectors.

The blade material may be selected to minimize abrasion of the cable's surface while providing for an efficient cleaning action. The blade can be made of a polytetrafluoroethylene (e.g., Teflon®) or other rigid plastic material that provides efficient cleaning with minimal cable surface abrasion. Other blade materials may also be suitable, including wood and metal, so long as care is taken to round the edges so as to minimize any risk of cutting into the survey cable's surface.

FIG. 9 shows an illustrative survey cable cleaning method. In block 902, a scraper mechanism such as a set of scraper blade devices or a set of scraper wheels is attached to a cable guide, which is then mounted to a workboat in block 904. In block 906 a work crew positions the cleaning tool in operable relation to the survey cable, e.g., by lifting the cable into position on the cable guide and separating the compliant arms to place survey cable between the scraper wheels/blades.

With the cleaning tool in position, the work crew drives the workboat along the length of the survey cable as represented by block 908. As the workboat moves the cleaning tool, the roller mechanism or slides in the cable guide lift the survey cable to or above the water's surface in block 910 to facilitate monitoring of the cleaning process. The cable guide further guides the survey cable into the scraper mechanism which employs scraper wheels and/or scraper blade devices to remove debris from the cable. As described previously, the scraper wheels may be driven by the roller mechanism or a motor to spin against the motion of the cable through the cleaning device. In block 914, connectors or other enlarged-profile portions of the cable are accommodated by the compliant arms or retractable blades in the scraper mechanism. Blades may be retracted by levers that detect the leading edge of the connectors, while scraper wheels may be configured to move apart from each other on compliant arms. Such automated operation may facilitate the cleaning operation.

Other variations, equivalents, and modifications will become apparent to those skilled in the art once the above disclosure is fully appreciated. For example, the belt drive system can be augmented or replaced by a gear transmission designed to provide the scraper wheels with a desired and/or variable rotation rate. It is intended that the following claims be interpreted to embrace all such variations and modifications.

What is claimed is:

1. A survey cable cleaning method comprising: moving a cleaning tool along a survey cable deployed in a body of water, wherein the cleaning tool comprises a roller mechanism and two or more scraper wheels; lifting the survey cable to a surface of the body of water, wherein the lifting includes passing the survey cable over the roller mechanism; and rotating the two or more scraper wheels against the survey cable.

2. The method of claim 1, further comprising pressing the two or more scraper wheels against the survey cable with compliant arms.

3. The method of claim 1, further comprising using the roller mechanism to drive rotation of the two or more scraper wheels.

4. The method of claim 1, further comprising driving rotation of the two or more scraper wheels with a motor.

5. A survey cable cleaning method comprising:
moving a cleaning tool along a marine seismic survey cable towed behind a survey vessel in a body of water;
lifting a first portion of the survey cable to a surface of the body of such that other portions on each side of the first portion remain submerged in the body of water; and
rotating two or more scraper wheels against the survey cable.

6. The method of claim 5, further comprising pressing the two or more scraper wheels against the survey cable with compliant arms.

7. The method of claim 5, further comprising driving rotation of the two or more scraper wheels with a motor.

8. The method of claim 5, wherein the lifting includes passing the survey cable over a roller mechanism.

9. The method of claim 8, further comprising using the roller mechanism to drive rotation of the two or more scraper wheels.

* * * * *